US008755368B2

(12) United States Patent
Kuechenhoff et al.

(10) Patent No.: US 8,755,368 B2
(45) Date of Patent: Jun. 17, 2014

(54) NETWORK-INDEPENDENT PROVISION AND REGISTRATION FOR SERVICES

(75) Inventors: Stefan Kuechenhoff, Oberhaching (DE); Martin Riebl, Munich (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 1753 days.

(21) Appl. No.: 11/885,646

(22) PCT Filed: Mar. 15, 2006

(86) PCT No.: PCT/EP2006/060730
§ 371 (c)(1),
(2), (4) Date: Apr. 15, 2008

(87) PCT Pub. No.: WO2006/100198
PCT Pub. Date: Sep. 28, 2006

(65) Prior Publication Data
US 2008/0232348 A1 Sep. 25, 2008

(30) Foreign Application Priority Data
Mar. 24, 2005 (DE) .......... 10 2005 013 907

(51) Int. Cl.
*H04J 3/06* (2006.01)
*H04B 7/212* (2006.01)
*H04L 12/28* (2006.01)
*G06F 15/16* (2006.01)

(52) U.S. Cl.
USPC ............ 370/350; 370/324; 370/351; 709/206

(58) Field of Classification Search
CPC ....... H04M 3/53; H04M 3/382; H04M 3/487; H04M 2203/4509
USPC ........... 370/324, 350, 351, 352–356; 709/206
See application file for complete search history.

(56) References Cited

U.S. PATENT DOCUMENTS

| | | | |
|---|---|---|---|
| 6,868,143 B1 | 3/2005 | Menon et al. | |
| 7,483,960 B2 * | 1/2009 | Kyusojin | 709/219 |
| 7,539,291 B2 * | 5/2009 | D'Angelo et al. | 379/88.17 |
| 2002/0025813 A1 | 2/2002 | Boehmer et al. | |
| 2004/0131081 A1 * | 7/2004 | Bhatia et al. | 370/466 |
| 2004/0248570 A1 * | 12/2004 | Denenberg et al. | 455/432.3 |
| 2005/0047399 A1 * | 3/2005 | Lee et al. | 370/352 |
| 2005/0163108 A1 * | 7/2005 | Moore et al. | 370/352 |

FOREIGN PATENT DOCUMENTS

GB 2 322 998 A 9/1998

* cited by examiner

*Primary Examiner* — Asad Nawaz
*Assistant Examiner* — Joel Hamel
(74) *Attorney, Agent, or Firm* — Laurence A. Greenberg; Werner H. Stemer; Ralph E. Locher

(57) ABSTRACT

In a method for providing a service between a service unit and terminal devices of at least one communication network, a synchronization unit evaluates the service provided by a service unit with respect to at least one technical requirement for use by at least one terminal device, establishes at least one rule for exchanging data of the service in accordance with the evaluation result, and stores the evaluation result. The synchronization unit forwards information regarding a registration for a service to at least one network unit of at least one communication network, with which a user of the terminal devices is registered. Upon inquiry by a terminal device for provision of the service through the service unit the synchronization unit exchanges the data via the synchronization unit in accordance with at least one established rule that depends on the technical requirements of the inquiring terminal device.

11 Claims, 2 Drawing Sheets

NETWORK-INDEPENDENT PROVISION AND REGISTRATION FOR SERVICES

CROSS-REFERENCE TO RELATED APPLICATIONS

The present application is a national phase application of PCT/EP2006/060730, filed on Mar. 15, 2006, which claims priority to German application no. DE 10 2005 013 907.8, filed on Mar. 24, 2005, both of which are hereby incorporated by reference.

BACKGROUND OF THE INVENTION

The invention relates to a method and a device for providing a service between a service unit and terminal devices of at least one communication network.

There are currently two possibilities for providing services in a communication network:
- The service is linked to the network technology, as, for example, a packet switching communication network, an IP network or a line switching communication network. A user can only use the service via a terminal device allocated to this communication network.
- The service is not linked to a communication network. Thereby a user can access the contents of a service via terminal device supported by the service. As an example, one can look at a unified messaging service, where the user can retrieve messages via, for example, e-mail (Internet access and browser interface) or, for example, voice mail (PSTN, PLMN access, voice portal interface).

Services that are fixed to a communication network, i.e. use the resources of the communication network, can only be usefully accessed via this communication network, and a user must register for this service via this communication network and the associated terminal device. If the user wants to use this service via different communication networks, then the user must register several times, separately via each communication network, and is not recognisable as one and the same user for the service. The service user specific data required for the services must be stored and maintained in different databases and in different formats in the databases depending on the signalling used and the network technology. From the service user's point of view, depending on the signalling and network technology used, that means several different services. This means a high level of effort and longer times for the provision both for the service provider as well as for the network operator. The service user must register for this service in each communication network, in which he wishes to use the service.

SUMMARY OF THE INVENTION

The object of the invention is to propose a simple and efficient option for the provision of services for different communication networks.

According to the invention the object is achieved by the subject matters of the independent claims. Further developments of the invention are set out in the subclaims.

A key element of the invention is that a synchronization unit evaluates the service provided by a service unit with respect to at least one technical requirement for the use by at least one terminal device, establishes at least one rule for exchanging data of the service in accordance with the evaluation result and stores the evaluation result. Further, upon inquiry by a terminal device for provision of the service through the service unit, the data are exchanged via the synchronization unit in accordance with the at least one established rule that complies with the technical requirements of the inquiring terminal device. A mapping rule for exchanging data in accordance with signalling protocol in data in accordance with a different signalling protocol could, for example, be established as an at least one rule. The signalling protocol used could be a SIP protocol, an H.323 protocol, an http protocol, an HTTPS protocol, an XML/SOAP protocol, an ISUP protocol, an ISDN protocol, a landline network signalling protocol, an Internet protocol etc.

A synchronization unit is introduced into a communication network, which synchronization unit synchronises the service specific data of the service user between the individual networks. Thereby, for example, a landline network, a cellular radio network, an IP network, a packet switching communication network, a line switched communication network etc. can be used as a communication network. The introduction of this synchronization unit means that the services only need to be provided once and the service user only needs to register for the service once based on network technology of his choice.

The sequence for service provision is as follows:
i) The service provider provides the service for all network technologies, hence different communication networks, with a service unit.
ii) In the synchronization unit the service is made known, evaluated and at least one rule with respect to the technical requirements of a terminal device for exchanging data of the service is specified. A rule can give, for example, an algorithm for synchronizing the data. The technical requirements refer to the type of the terminal device, the communication network, via which the terminal device can communicate, the signalling to be used, the display options at the terminal device etc.

The registration of the service user for a service proceeds as follows:
iii) The service user registers for the use of a service (entering profiles, etc.) with the service unit and does so only once using the network technology he currently uses or wishes to use.
iv) The service unit informs the synchronization unit.
v) The synchronization unit checks which communication networks the user is registered for.
vi) The registration for the service in other communication networks is made via the synchronization unit.

Thus the services related to the service user's registration for services are available to said service user in the other communication networks for which he is registered, or can use.

The synchronization unit assumes the following functions:
vii) Registration of the service user in all the communication networks in which the service user is registered.
viii) Recognition of notifications from the service unit, that there are changes in the process that require the registration data to be changed.
ix) Changing the registration data in all communication networks for all users.

An advantage for the service user is that he only needs to make service specific registrations once and not for each communication network and the service is available to him in every communication network.

The advantage for the network operator is that he can register the users for a service quickly, at a reasonable price and automatically in all communication networks and the automatism that is implemented in the synchronization unit prevents incoherencies. When the service user is registered in new communication networks, the services used by the user are also registered by the synchronization unit.

The advantage for the service provider is that the service is available to the service user in all communication networks and a service is thus more intensively used.

BRIEF DESCRIPTION OF THE SEVERAL VIEWS OF THE DRAWINGS

The invention is explained in greater detail using an embodiment shown in a figure. Shown are FIG. 1 the provision of a service using the inventive method, FIG. 2 an inventive device.

DETAILED DESCRIPTION OF THE INVENTION

Figure 1:
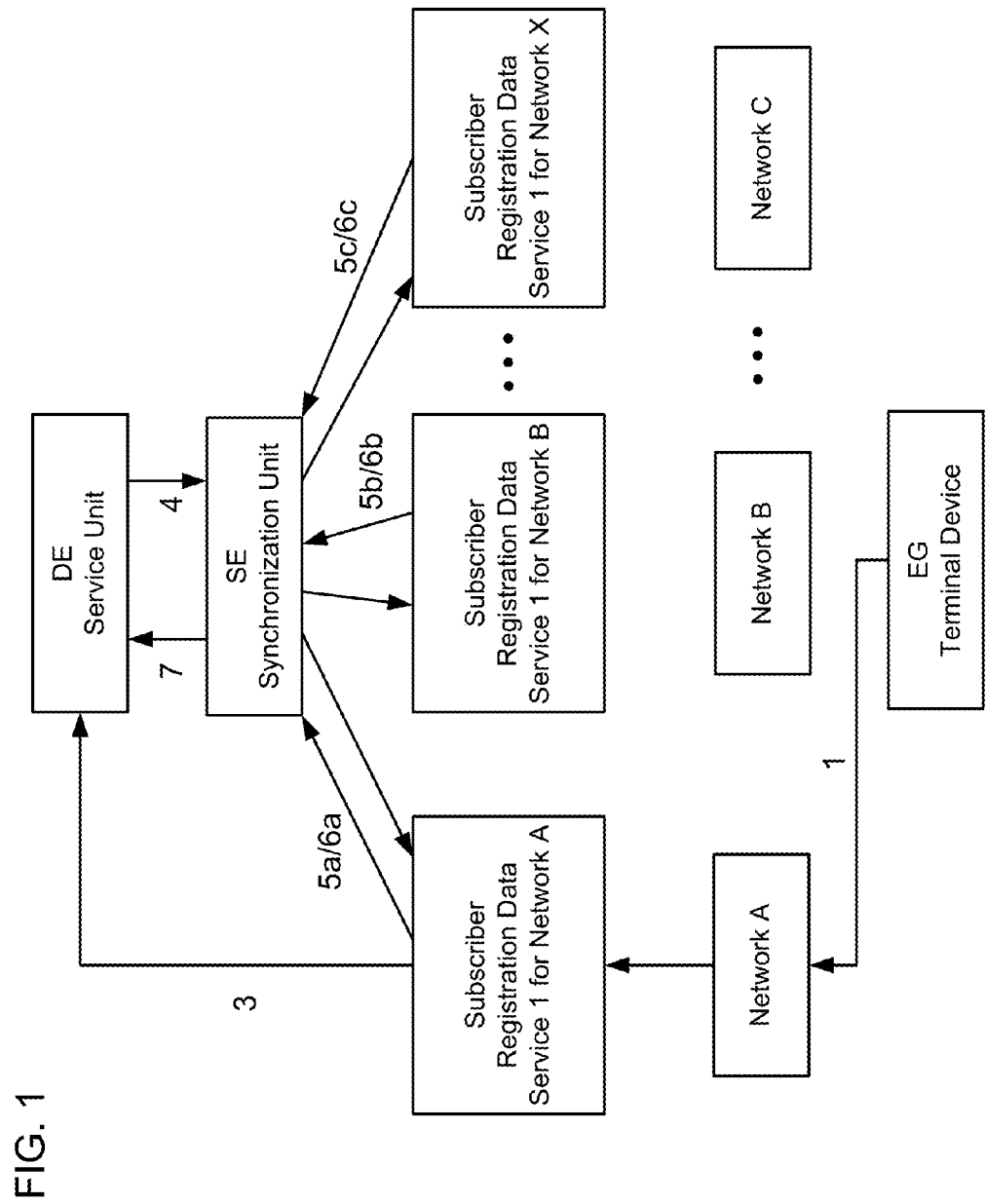

FIG. 1 shows how a user with a terminal device EG registers for the use of a service (entering profiles etc.) with the service unit DE (1 to 3) via the communication network, network A. The service unit (DE) informs the synchronization unit SE about this registration, by sending information regarding registration to the synchronization unit SE (4). The synchronization unit SE checks which communication networks the user of the terminal device EG is registered in. Prior to that the service unit DE made the service known to the synchronization unit SE and the synchronization unit evaluated the service with respect to the technical requirements for use by a terminal device, stored the evaluation result and established at least one rule for exchanging data of the service in accordance with the evaluation result. The synchronization unit makes the registration for the service in further network units such as, for example, databases, HLR (Home Location Register), VLR (Visitor Location Register) etc. of the other communication networks network B, network X (5a-n, 6a-n). Thus the services related to the stored evaluation result are available to the service user with the terminal device EG for all protocols and network technologies for which he is registered.

The inventive method allows the linking of a service with several communication networks, network A, network B, network X, and the automatic registration of the user for the service via each communication network, in which the user together with his terminal device EG and the service are known. As terminal device EG the user can use a mobile communications terminal, a landline network terminal, a computer, a mobile computer, a set-top box (device for video telephony and for receiving (digital) television channels via, for example, an IP network), a mobile organiser etc. With these, the user with his terminal device EG only needs to register once for the service. The synchronization unit SE makes sure that the user with one terminal device can use the service via all the communication networks subscribed by him with the same network operator, without his having to register again. The service provider achieves added value because his service is used more often. The accessibility of the service increases due to the improved accessibility of the user or the service. This enables the service provider to minimise the size of his user database, as each user is only registered once and can also be uniquely allocated for different communication networks. The network operator increases its desirability to user and service provider, as this functionality represents an added value for both groups. Moreover via this functionality, the network operator can link the user data. The service and maintenance work can be simplified for the service and network providers as multiple registration or linking of user data becomes unnecessary. This allows the administration costs to be reduced.

A user with his terminal device EG is subscribed as a PSTN user (network A), as a mobile communications user (network B) and as an Internet user (network X) with a network operator who offers these three services. This method is technologically not dependent on the different communication networks being provided by one network operator. However, it makes sense to have an appropriate contractual relation in place in the case of different operators who organise the forwarding and amendment of user data. For allocation in the respective network, the user is allocated for example a PSTN E.164 number, a PLMN E.164 number, and an ID for Internet use. The method is based on a synchronization unit SE, which links these three user data. This linking can be input administratively by the network operator or by users, for example, via a web portal or a voice portal. This is not part of this method, only a prerequisite.

For example, the user registers for the share price push service. To this end he uses any terminal device EG (analogue telephone, GSM mobile phone, Internet capable PC) allocated to a communication network. Let it be assumed that the user registers via his PSTN access (network A) using an analogue telephone and a voice portal with this service. By way of the call number (CLIP service) and the confirmation of this number by the user during the dialogue, the registration is permanently allocated to the PSTN number in the service unit DE. After completion of the registration and authentication of the user, a dialogue is established in a dialogue between the service unit DE and the synchronization unit SE. Herein the service unit DE informs the synchronization unit SE of e.g. the user's PSTN number as information regarding the registration for a service, and retrieves further allocated user data from other communication networks. The synchronization unit SE identifies the other communication networks and data allocated to the user (uniquely identifiable by the PSTN number), i.e. the GSM call number and the online ID of the user. The synchronization unit SE takes on the registration of the service user for the service in the other networks (GSM and Internet). This data is reported back to the service unit DE and there it is allocated to the user with his terminal devices EG.

In addition the method also allows the capabilities of the terminal device and/or the technical requirements of the terminal device that the user currently possesses to be allocated to the user profile. This has the advantage that the service can be transmitted immediately in the form in which it can be optimally displayed in the terminal device EG of the user.

The user can now use the service with one of his terminal devices via each of the subscribed communication networks without having to register again to do so.

An important advantage of the method lies in that synchronization unit SE automatically notifies changes in the profile of the user to the different services, and the service unit DE can be updated there. The user does not have to administer changes in each service separately. This means that the user can, for example, subscribe to a further communication network or unsubscribe from a communication network, or that other terminal devices with different capabilities (technical requirements) are used. The services can adjust to the changed user access requirements without manual intervention on the part of the user or of an administrator.

Figure 2:
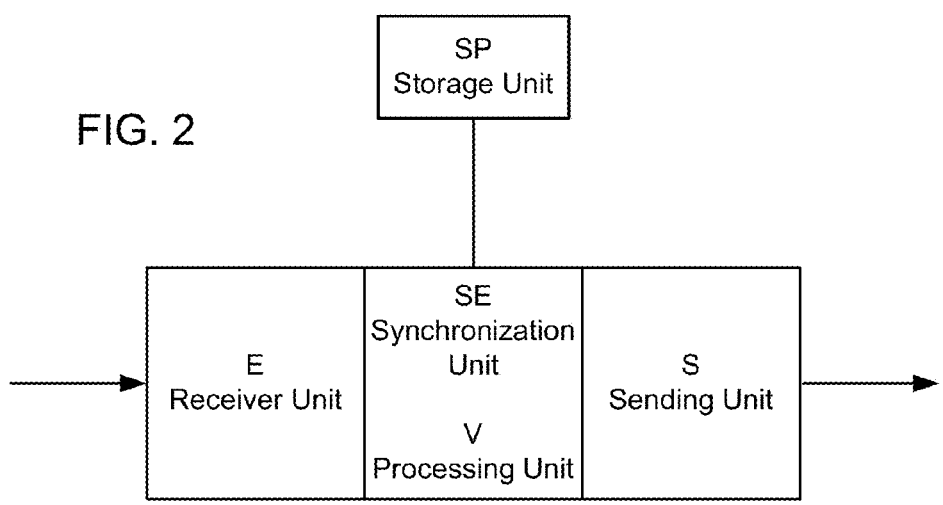

FIG. 2 shows an inventive device for implementing the inventive method shown in FIG. 1 with a receiver unit E, a sending unit S, a processing unit V and a storage unit SP.

The invention claimed is:

1. A method for providing a service between a service unit and terminal devices of a user via at least two communication networks, comprising:
providing a synchronization unit that enables the user to access the service via each one of a plurality of communication networks subscribed to by the user without needing to register for the service again after an initial registration;
receiving an information in the synchronization unit, the information being from the service unit and the information regarding a registration of the user for the service by a terminal device via a communication network;
evaluating by the synchronization unit the service provided by the service unit with respect to at least one technical requirement for a use of the service by at least one terminal device via at least one further communication network;
establishing by the synchronization unit at least one rule for exchanging data of the service in accordance with the evaluation result;
storing by the synchronization unit the evaluation result;
forwarding by the synchronization unit a further information regarding the registration for the service to at least one network unit of the at least one further communication network, with which at least one further communication network the user of the terminal devices is registered; and
upon inquiry by the at least one terminal device for provision of the service through the service unit exchanging the data via the synchronization unit in accordance with the at least one established rule that depends on the technical requirements of the inquiring at least one terminal device.

2. The method of claim 1, further comprising:
in order to provide the service, selecting by the synchronization unit according to the technical requirements of the inquiring at least one terminal device, at least one established rule for exchanging data of the service.

3. The method of claim 1, further comprising:
selecting the at least one technical requirement from the group consisting of a signaling protocol to be used, a communication network to be used, and a characteristic of the at least one terminal device; and
evaluating, by the synchronization unit, the at least one technical requirement.

4. The method of claim 1, wherein:
at least one of a mobile communications terminal, a landline network terminal, a computer, a mobile computer, a set top box, and a mobile organizer is used as a terminal device.

5. The method of claim 1, wherein:
at least one of a landline network, a cellular radio network, an IP network, a packet switching communication network and a line switching communication network is used as a communication network.

6. The method of claim 1, further comprising:
establishing as the at least one rule a mapping rule for mapping exchanging data according to a signaling protocol in exchanging data according to a further signaling protocol.

7. The method of claim 1, further comprising:
storing at least one piece of information with respect to the registration for the service for the at least one terminal device of the at least one further communication network in the synchronization unit.

8. The method of claim 7, further comprising:
receiving by the synchronization unit information regarding the registration for the service from a network unit and saving the information from the network unit in a service profile of the user.

9. The method of claim 8, further comprising:
establishing by the synchronization unit the at least one rule for exchanging data of the service in accordance with the information received relating to the registration.

10. A device for providing a service between a service unit and terminal devices of a user via at least two communication networks, comprising:
a receiver unit and a sending unit for implementing communication, wherein the receiver unit is adapted for receiving from the service unit an information regarding a registration of the user for the service by a terminal device via a communication network;
a processing unit for evaluating the service provided by the service unit with respect to at least one technical requirement for a use of the service by at least one terminal device via at least one further communication network and for establishing at least one rule for exchanging data of the service in accordance with an evaluation result;
said processing unit for forwarding a further information regarding the registration for the service to at least one network unit of the at least one further communication network, with which the user of the terminal devices is registered;
a storage unit for storing the evaluation result and the information regarding the registration of the user for the service; and
said processing unit for exchanging data in accordance with the at least one established rule upon inquiry by the at least one terminal device for provision of the service through the service unit, wherein the at least one established rule depends on the technical requirements of the inquiring at least one terminal device;
said processing unit configured for enabling the user to access the service via each one of a plurality of communication networks subscribed to by the user without needing to register for the service again after an initial registration.

11. The device of claim 10, wherein the at least one technical requirement is selected from the group consisting of a signaling protocol to be used, a communication network to be used, and a characteristic of the at least one terminal device.

* * * * *